United States Patent
Schwartz

[15] 3,696,328
[45] Oct. 3, 1972

[54] SONAR APPARATUS, PARTICULARLY FOR DEEP-SEA FISHING

[72] Inventor: Werner Schwartz, Bremen-Oberneuland, Germany

[73] Assignee: Fried Krupp Gesellschaft mit beschraenkter, Haftung, Essen, Germany

[22] Filed: May 21, 1970

[21] Appl. No.: 39,315

[30] Foreign Application Priority Data

May 28, 1969 Germany..........P 19 27 172.8

[52] U.S. Cl..............340/3 R, 343/17.2 R, 340/3 FM
[51] Int. Cl.................................................G01s 9/70
[58] Field of Search....................340/3 FM, 3 D, 3 R; 343/17.2 R

[56] References Cited

UNITED STATES PATENTS

| 3,332,056 | 7/1967 | Drenkelfort | 340/3 R |
| 3,487,409 | 12/1969 | Thiele et al. | 343/17.2 R |

Primary Examiner—Richard A. Farley
Attorney—Spencer & Kaye

[57] ABSTRACT

A sonar system, particularly for use for deep-sea fishing, which produces an indication, either optical or acoustical, representative of the received signals which shows not only the range of the reflecting object but additionally whether the reflecting object is a single object or a plurality of closely bunched objects. The transmitted signals are relatively long keyed pulses each of which contains a plurality of non-monochromatic oscillations which have a distinct predetermined arrangement in time, and has a broad bandwidth as compared to the center frequency of the oscillations. A voltage proportional to the instantaneous or momentary frequency of the received signals is then utilized to modulate the ranging or distance proportional voltage in the indicating device, e.g. a cathode ray tube of an echograph, in order to produce the additional indication representative of the type of reflecting object.

14 Claims, 16 Drawing Figures

Inventor:
Werner Schwarz

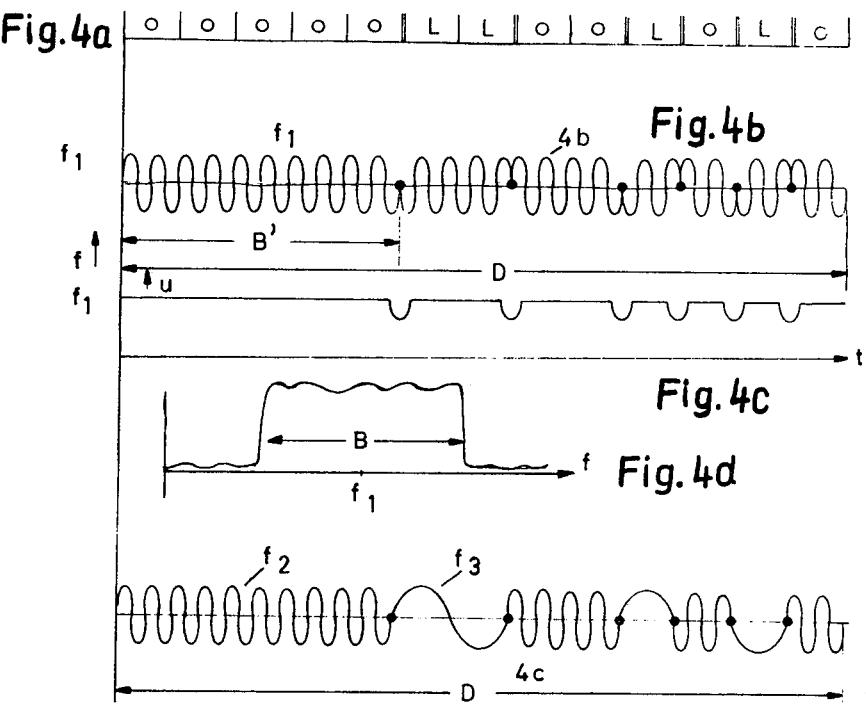
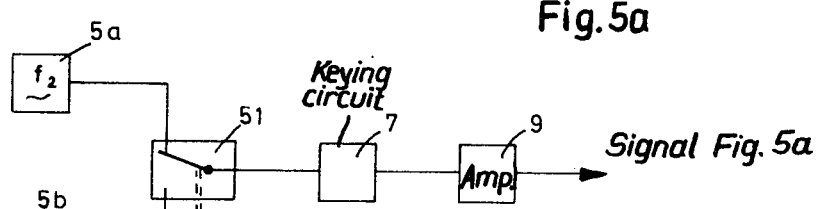
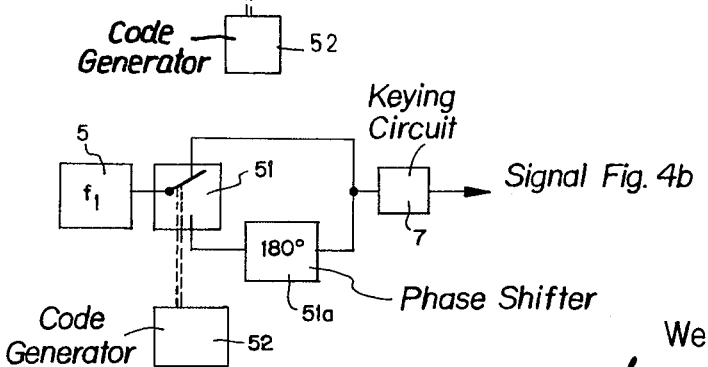
Inventor:
Werner Schwarz 3,696,328

SONAR APPARATUS, PARTICULARLY FOR DEEP-SEA FISHING

BACKGROUND OF THE INVENTION

The present invention relates to a sonar apparatus, particularly for use in deep-sea fishing, with a transmitting device for the directed emission of keyed transmitted pulses each having a plurality of non-monochromatic oscillations, and with a receiving arrangement connected to a receiving base provided with means for converting the received signals in order to provide a preferably optical or acoustical representation of the ranging information.

Known radar system of this general type provide satisfactory representations for dot-shaped and for linear objects, for example, by clear indication on the screen of a cathode-ray tube. In one such conventional system the image point or points become brighter on the face of the cathode-ray tube depending on the objects in the sector being covered by the radar device, after radial deflection of the cathode beam of the cathode-ray tube by an output voltage from a time discriminator which is proportional to the distance of the reflecting object. When cathode-ray tubes are used, this time discriminator is usually an integrator controlled by a constant voltage or another sawtooth generator. When writing indicators, the so-called echographs, are used to present the ranging information, the time discriminator is the writing stylus which moves at a constant speed.

The result of the ranging information indication according to this or any other known processes, which will be discussed later, is unsatisfactory, however, in the case of an areal or voluminous congregation of individual objects, e.g., a school of fish, as occurs particularly in deep-sea fishing. This is due to the fact that in these cases of areal or voluminous congregations of individual objects, the ranging information is represented, for example, on the screen of a cathode-ray tube, as in the case of a single reflecting object only in the form of a line or dot, respectively, corresponding with the center of mass of the entirety of the covered, closely bunched objects. The fisherman, however, is very interested in being able to determine, from the ranging information offered on the screen of the cathode-ray tube or on the paper strip of the echograph, whether this information originates from individual large rocks, wrecks, large-size individual fish or other individual dot-shaped reflecting objects or whether this is an entire school of fish which would promise a worthwhile catch and should be approached.

It would therefore be highly advantageous if a system of the general type mentioned above could be provided which permits unequivocal conclusions from the ranging information obtained and indicated e.g. on the screen of a cathode-ray tube, as to whether the representation originates from an individual dot-shaped object or from a larger number of bunched individual objects. The present invention which supplies this need is based on the following observations and contemplations: A school of fish consists of a large number of dot-shaped reflecting objects whose position with respect to one another is continuously changing. As long as during the ranging process the duration of the transmitted pulses is short when compared to the travel time difference between the individual echoes of individual fish from the school of fish, separate echoes result which lead to separate dot-shaped representations in the illustration of the ranging information on the screen of the cathode-ray tube. While it is known that the shorter the transmitted pulse, the better the distance resolution, i.e. the better the individual echoes will result in separately illustrated dot-shaped representations without any mutual time influence, it is also known that very short transmitted pulses, due to their being relatively broadbanded, require a substantial amount of apparatus for accomplishing the echo sounding and moreover have the drawback that their echoes can not very easily be recognized and represented due to the high noise level. While it is possible to achieve a more favorable signal to noise ratio by utilizing transmitted pulses of longer duration, the representation of the information is then predominantly composed of time overlaps of the individual echoes. The known use of keyed sine wave pulses as the transmitted pulses in such applications leads to falsified representations of the ranging information because the received signals all consist only of frequency components of the same fundamental frequency, i.e. the transmitting frequency. This then results, in the known systems, in the above-mentioned representation of predominantly the center of mass of the school of fish as a luminous point on the screen of the cathode-ray tube without any indication of the fact that the reflections are not from an individual reflecting object being recognizable on the screen of the cathode-ray tube.

High-quality sonar systems contain devices for the combined representation of the sounding information to indicate not only the distance of the reflecting objects but also their lateral deviation from the main direction of the major lobe of the sending/receiving characteristic. With such a system, for example, as disclosed in German Pat. No. 977,599, monochromatic or quasimonochromatic transmitted pulses whose duration is adapted to the requirements for distance resolution and for the signal to noise ratio are used. In this system, the information with respect to the lateral deviation is derived from the phase difference between the signals received by means of two receivers or two groups of receivers. However, almost no information is provided with respect to the extent of a located aggregation of individual objects transverse to the propagation direction of the transmitted pulses. The components of the received signals or voltages originating from the individual dot-shaped reflectors in the form of individual fish, as well as the oscillations of the transmitted pulses, are sinusoidal and contain as their fundamental the carrier frequency of the transmitted pulse. A travel time discriminator with a subsequently connected delay member or subsequently connected integrator with a time constant which is large compared with the period of the carrier frequency is connected to the two receivers or groups of receivers and thus furnishes an output voltage corresponding to the average phase position of all of the individual reflectors for the transverse deflection of the electron beam in the cathode-ray tube. That is, the sounding or ranging information represented again corresponds substantially to the type of information which would result from a single reflector at the center of mass of the school. The information that this is in fact an entire school of fish is again lost.

It is known for different fields of application to provide radar systems with transmitted pulses comprising a mixture of a plurality of frequencies instead of using monochromatic transmitted pulses. The correlation process disclosed for the first time in Swiss Pat. No. 220,877 employs a mixture of different frequencies, preferably even a noise signal, for the unequivocal distance measuring of individual objects in spite of the presence of substantial interference components. Moreover, the use of two different frequencies for sonar is known, for example, as disclosed in German Pat. No. 1,017,054 for the distinct indication of the interfare between mud and solid bottom in bodies of water. Other known apparatus employ sonar devices with linear or nonlinear frequency-modulated oscillations to produce a continuous representation of the sounding information which is no longer dependent on the periods given by the transmission of keyed pulses.

None of these or any other known device, however, is based on the problem of the present invention, nor do the teachings disclosed therein represent concrete indications as to how the problem can be solved by furnishing sonar systems with a representation of the sounding information from objects according to their distance — and if necessary direction — with simultaneous differentiation between individual dot-shaped objects and areal or voluminous congregations of individual objects after conversion of the received voltages.

SUMMARY OF THE INVENTION

The above-mentioned problem, of distinctly indicating individual objects, as for example entire schools of fish, has been solved for sonar systems by the present invention in that transmitted pulses of long duration are used which exhibit a distinct arrangement of the oscillations with respect to time and which are broadbanded when compared with the characteristic center frequency of the oscillations, and an identifying voltage which is proportional to the momentary or instantaneous frequency of the received signal is generated and utilized to modulate the ranging information in the indicating device.

The problem on which the present invention is based is solved by the above-mentioned special selection and combination of the transmitted pulses and conversion of the received voltages for representing the sounding informations. This solution is based on the use of the known fact that a dot-shaped reflector reflects the transmitted signal exactly to the location of the receiving base so that the original order of the transmitted pulses is again contained in the received signals. In contradistinction thereto, the original time arrangement within the transmitted pulses does not appear in the same order in the received signals when components from different, particularly from independently moving, dot-shaped reflecting objects located at different distances, and thus having different travel times, are superimposed at the receiving end.

The teaching according to the present invention therefore requires the possibility for the displacement of the defined time arrangement of the oscillations originally contained in the transmitted pulse. Such a displacement is used as a criterion for the presence of an aggregation of individual reflectors as additional information during the conversion of the received signals or voltages for the representation of the ranging information. According to the present invention an identifying voltage is used for this purpose which is proportional to the momentary or instantaneous frequency of the received voltages and which serves to modulate the means for converting the received voltages into a representative indication. From the use of statistical methods in the radar art, it is known to impart a certain identification to the transmitted signal, for example, a time pattern produced by digital coding. The received signal is then conducted through an optimum filter which furnishes an output voltage only in the case of a signal which returns without displacement. Such systems, however, are very expensive and complicated in their apparatus so that while they can be used for special applications, they will never gain acceptance in the commercial fishery industry. Moreover, such installations do not always give a distinguishable evaluation of individual dot-shaped reflecting objects as compared to a congregation of dot-shaped objects, since this type of problem has thus far not been acute in such systems.

In contradistinction thereto, the solution of the problem provided by the present invention represents a device which can be realized with relatively simple circuit means since the determination of the momentary frequency of the received voltages as well as the use of an identifying voltage proportional to these momentary frequencies for the modulation of the signal conversion means for the received voltages to provide a representation of the sounding information does not produce any difficulties as regards circuitry. It is only necessary for this purpose to use transmitted pulses of the above-described type, i.e. pulses whose oscillations have a wide bandwidth with simultaneously only a slight fluctuation of their momentary frequency during the duration of the pulse. With the additionally selected long duration of the transmitted pulses there is thus provided the possibility for a noticeable displacement of the original order or arrangement of the oscillations within each transmitted pulse as the criterion for the presence of a congregation of individual reflecting objects with a simultaneously favorable signal to noise ratio.

It is possible, for example, to frequency-modulate the oscillations of a transmitted pulse during the duration of this pulse, linearly with time. The received voltages originating from a single reflecting object would then also exhibit this rise in the frequency of the oscillations and the identifying voltage proportional to the momentary frequency could then have a continuously rising course. If the transmitted pulses were reflected from a congregation of individual dot-shaped objects, the momentary frequency of the received voltages would not exhibit this continuously rising course, but would fluctuate strongly and so would the course of the identifying voltage. Because of the simple evaluation possibility for the modulating identifying voltage, a linear frequency modulation of the transmitted pulses would be preferable, although principally the same characteristic result also could be achieved with other time sequences for the momentary frequency of the transmitted pulse oscillations.

However, frequency modulation has the drawback that the requirements for a momentary frequency which is as constant as possible over time and at the same time for a wide bandwidth for the oscillations of the transmitted pulses, i.e. the requirement for an identifying voltage which is as constant as possible for dot-shaped individual objects and conversely is strongly fluctuating for a congregation of objects, contradict one another. It is therefore more advantageous, according to another embodiment of the present invention, to utilize, transmitted pulses having oscillations of unchanging frequency which are phase-adjusted according to a predetermined code. Whereas in this case the momentary frequency of the individual oscillations is constant except for the moment of the phase shift, the total spectrum of these oscillations is very broad due to the phase adjustment. A suitable code for this purpose is the so-called Barker code which had originally been developed for other purposes. Other codes which are less commonly used due to their characteristics with respect to their autocorrelation functions being inferior to those of the Barker code, can also be used for this purpose but can not be grouped under a typical name. If a certain fluctuation of the identifying voltage between two limit values is disregarded, this will result in an advantageous further widening of the effective spectrum of the oscillations of each transmitted pulse with the use of a coded shift adjustment between oscillations of at least two different frequencies.

In order to be able to determine fluctuations in the identifying voltage when the original order of the oscillations are disturbed, it is advisable to determine the number of zero voltage crossing of the oscillations in the received voltage during a predetermined observation time period which is short when compared with the duration of the transmitted pulses. Advantageously this observation period is selected in the order of magnitude of the period of the center frequency of the oscillations.

A useful possibility for representing the sounding or ranging information is the optical representation on the screen of a cathode-ray tube after converting the received voltages by means of the already mentioned time-proportional deflection of the cathode beam which is brightness-controlled by the arrival of the received voltages. While the modulation by the identifying voltage can be accomplished by brightness modulation of the beam, a transverse deflection of the beam according to the time pattern of the identifying voltage is more appropriate. This will then no longer produce a single luminous spot, but rather a blurred area of somewhat reduced brightness. This modulation can also be expanded in such a manner that whenever the identifying voltage exceeds a certain waviness, i.e., at the presence of the criterion for a congregation of individual objects, an oscillator, for example, an astable multivibrator, is turned on to produce a uniform blurred area on the face of the cathode-ray tube by means of a uniform transverse deflection of the cathode beam which is brightness-controlled by the arrival of the received signals.

According to another feature of the invention, in place of the cathode-ray tube, another commonly used device for the optical representation of the sounding information, i.e., an echograph, may be utilized. In such a device the stylus used as the means for converting the information does not normally provide for the possibility of a deflection transverse to its direction of travel. While the modulation could be accomplished by blackening the graph, according to the present invention, a vibrating transverse deflection of the moving stylus is provided by electromechanical means so that there is again produced an areal representation in the case of an aggregation of individually reflecting objects.

According to another feature of the invention, particularly for use in deep-sea fishing, an acoustical representation of the ranging information may be provided either instead of or in addition to the optical representation. If such an acoustical representation is provided, then it is advisable to modulate the amplitude or, more effectively, the frequency, or both, of the acoustic representation of the received signal with the identifying voltage after converting the received signals to an audible frequency range if necessary.

BRIEF DESCRIPTION OF THE FIGURES

FIG. 3a illustrates an example of a received signal, plotted over time, resulting from a reflection from a voluminous collection of individual objects for a transmitted pulse according to FIG. 2a.

FIG. 3b shows an example for the resulting momentary frequency, or the identifying voltage proportional thereto, respectively, in their courses over time for the received signal of FIG. 3a.

FIG. 4a shows the 13-digit Barker code.

FIG. 4b shows the course of sinusoidal oscillations of constant frequency which where phase-shifted by 180° according to the Barker code.

FIG. 4c shows the course of the momentary frequency over time for the signal of FIG. 4b.

FIG. 4d shows the spectrum of the frequency according to FIG. 4b over the frequency axis.

FIG. 4e shows a principal block diagram for producing the course shown in FIG. 4b.

FIG. 5a shows the course of two sinusoidal oscillations which are shifted according to the code of FIG. 4a to alternate between two different frequencies.

FIG. 5b shows a principal block diagram for producing the course shown in FIG. 5a.

DESCRIPTION OF THE PREFERRED EMBODIMENTS

Figure 1:
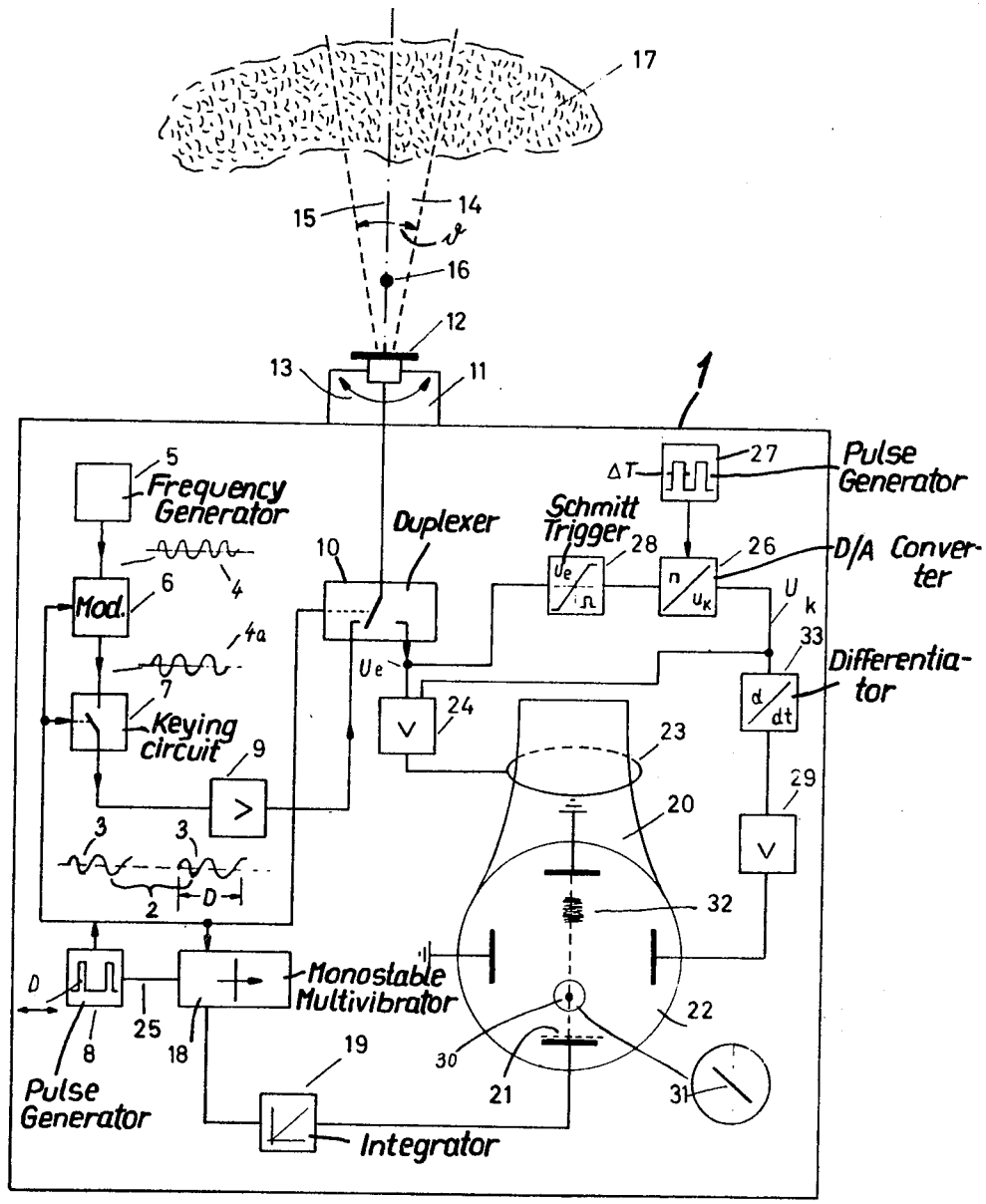
FIG. 1 shows the principal circuit diagram of a sonar system supplemented by one embodiment device of the present invention comprising a receiving arrangement with means for the additional conversion of received voltages for the purpose — in this embodiment — of optically representing the sounding information on the screen of a cathode-ray tube in order to provide indications having a different characteristic for a dot-shaped object and for a whole collection of reflecting objects.

Referring now to FIG. 1, there is shown a block diagram of a ranging device 1 which produces a transmitted signal 2 consisting of keyed pulses having, in this example, linearly frequency-modulated oscillations 4. The signal generator 5, which operates with a center frequency of for example $f_m = 30$ kHz, furnishes the oscillations 4 to a modulator 6 where they are frequency-modulated to produce the signal 4a. The output of modulator 6 is fed to a keying circuit 7, controlled by a pulse generator 8 which forms the transmitted pulses 3 of a certain duration D from the thus modulated wave train 4a of the oscillations 4. The output pulses from the pulse generator 8 are simultaneously utilized to accomplish synchronization to the initial frequency of modulator 6. The signal 2 which is to be transmitted is fed to a base 11, which in this circuit diagram contains a single resonator 12, via a transmitter amplifier 9 and a duplexer 10 commonly used in sonar devices, particularly in the echo sounding art. The double arrow 13 indicates that this base 11 may be pivotal. The possibility of pivoting only the transmitting/receiving characteristic 14 with the characteristic aperture angle $\alpha$ by electrical means instead of the entire base 11 will be discussed later in connection with FIG. 8.

In order to illustrate the various types of indications which will result with the system according to the invention, let it be assumed that at first there is only a single dot-shaped object 16 in front of the base 11, for example exactly on the main axis 15 of the transmitting/receiving characteristic 14, and that moreover, a portion of a larger collection of individual objects, hereinafter called a school of fish 17, is being sounded. The physical conditions in sonar are known, see e.g. D.G. Tucker "Sonar in Fisheries" London 1967, Chapters 1 and 2.

The processing of the returning echo, i.e. the conversion of received voltages for the representation of the sounding information, is initially also well known in the state of the art and is thus illustrated only in principle in FIG. 1 and in the following description. In order to represent the ranging information, the output signal from a monostable multivibrator 18, which is placed in its labile switching state at the beginning of each transmitted pulse 3 by the output pulse from pulse generator 8, controls the deflection, e.g. the vertical deflection, of an electron beam of a cathode-ray tube 20 via an integrator 19, and thus effects a distance-proportional deflection of the luminous dot 30 from the zero marker 21 of the screen 22. On this screen 22, however, an indication in the form of a luminous dot 30 appears only when, due to arriving echoes, the Wehnelt cylinder 23 of the cathode-ray tube 20 is brightness-controlled by the voltage $u_e$, corresponding to the received signal, generally via a receiver amplifier 24. In the illustrated example, the integrator 19 is reset, and thus the electron beam of the cathode-ray tube 20 is reset to the zero marker 21, when the monostable multivibrator 18 flips back to its stable switching state. Since it must be assured that this resetting occurs within the interval between two conservative transmitted pulses 3, a control line 25 is provided between the pulse generator 8 and a control input of the monostable multivibrator 18. Via the line 25 the transient time constant for the duration of the labile switching state of the monostable multivibrator 18 is also correspondingly changed whenever the pulse generator 8 switches to another repetition frequency for the transmitted pulses 3.

The above described receiving arrangement according to the state of the art for sonar systems is now supplemented according to the present invention by means for converting the received voltages $u_e$ for the representation of the ranging information with the possibility provided for differentiating individual dot-shaped objects 16 from the indication of a school of fish 17 on the screen 22 of the cathode-ray tube 20. For this purpose, the instantaneous or momentary frequency $f$ of the received voltages $u_e$ is determined, for example, by counting the number of zero crossings of the oscillations of the received voltages $u_e$ during a predetermined observation period $\Delta T$, and is converted into a proportional identifying voltage $u_k$ by means of a digital-analog converter 26. The measuring time for the observation period $\Delta T$ may be the pulse width of an astable multivibrator 27 which is connected with a gate input of the digital-analog converter 26. Such a converter 26, in a simple embodiment, may consist of an integrator which is charged in stages during the observation period $\Delta T$ by input pulses, which, in the illustrated embodiment, are furnished by a Schmitt trigger 28 set approximately to a trigger voltage of zero; and thus are generated when the momentary values of the voltages together with the oscillations of the received voltages $u_e$ change from the negative to the positive. The observation period $\Delta T$ is selected in the order of magnitude of the period of the characteristic center frequency $f_m$ of the modulated wave train 4a of the oscillations 4 in the transmitted pulses 3. Identifying voltages $u_k$ is applied after adaptation in an amplifier 29 if required, to the deflection system of the cathode ray tube 20, and serves to deflect the electron beam in the cathode-ray tube 20 in a direction transverse to the distance-proportional deflection caused by the voltage from integrator 19.

The individual dot-shaped object 16, in convential devices according to the state of the art, would lead to a luminous dot 30 on the screen 22 of the cathode-ray tube 20 during the representation of the ranging information. Since, however, in the selected example the transmitted pulses 3 contain a linearly modulated wave train 4a whose time arrangement is not substantially changed when reflected by a dot-shaped object 16, the identifying voltage $u_k$ is no longer constant but changes during the duration D of each transmitted pulse 3 proportionately to the course of the momentary frequency $f$. If it is assumed that a momentary frequency $f$ below the center frequency $f_m$ leads to a lateral deflection of the cathode beam toward the left on the screen 22, then the indication resulting from the received voltage $u_e$ on this screen 22 of cathode-ray tube 20 is an inclined line 31 corresponding to the enlarged illustration in FIG. 1. With only a slight change in time of the momentary frequency f during the duration D of the transmitted pulses 3, the fluctuation in the identifying voltage $u_k$ is also only slight, so that, in practice, there is still produced for the observer the impression of a luminous dot 30 due to the storage and overshoot effects of the screen 22 of a cathode-ray tube 20.

If, however, reflected portions of a statistic collection of individual dot-shaped objects, as they are assumed to be represented by the school of fish 17, are superimposed in the received voltage $u_e$, then the original time arrangement of the oscillations 4 is no longer contained in the received voltages $u_e$. Rather a large displacement of the time sequence of the zero crossings of the modulated wave train 4a within the received voltages $u_e$, and thus a large fluctuation in time of the identifying voltage $u_k$ results due to the superimposition or overlapping of the various components and the influence of the different distances from base 11 at which the individual fish are disposed, quite aside from Doppler effects from the individually moving reflecting objects. Consequently, the electron beam now does not experience a continuous transverse deflection corresponding to the inclined line 31, but rather the transverse deflection fluctuates strongly during the passage of the transmitted pulse 3 through the section of the school of fish being covered. Due to the strong fluctuation of the electron beam there now appears an areal brightening 32 on the screen 22 which is clearly distinguishable from the previously described dot 30 indicating a single reflecting object 16. Due to the rapid lateral deflection of the electron beam this areal brightening 32 is normally not as luminous as the luminous dot 30.

This difference in brightness can be compensated with simple, additional means or can be overcompensated if desired by applying the identifying voltage $u_k$ to a second input of the receiving amplifier 24 to additionally control the Wehnelt cylinder 23. To produce a particularly large lateral deflection of the electron beam, it is advisable to connect a differentiating stage 33 ahead of amplifier 29 so that the greater the displacement of the original order of the modulated wave train 4a, i.e., the greater the time fluctuations of identifying voltages $u_k$, the greater will be the control voltage applied to amplifier 29.

Figure 2A:
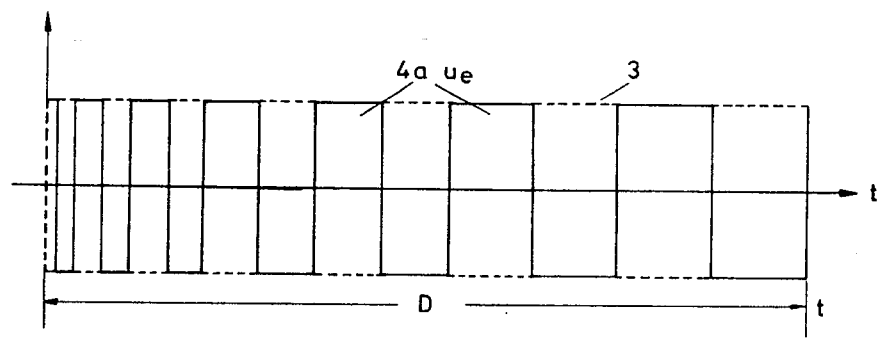
FIG. 2a shows a time-proportional frequency modulated transmitted signal, here a rectangular wave, plotted over time.
Figure 2B:
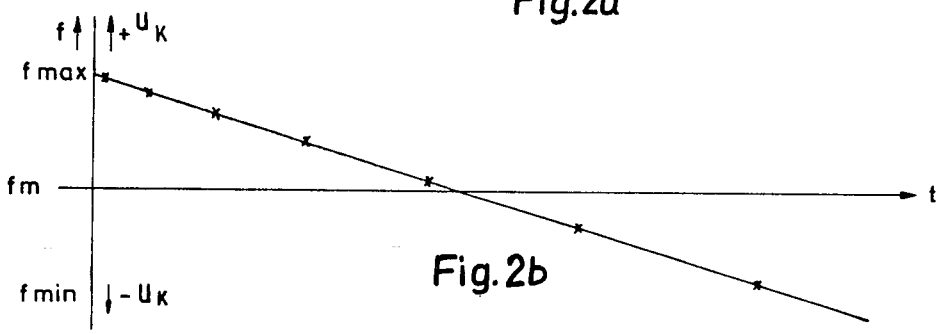
FIG. 2b shows the course of its momentary frequency, or the identifying voltage proportional thereto, plotted over time.
Figure 3A:
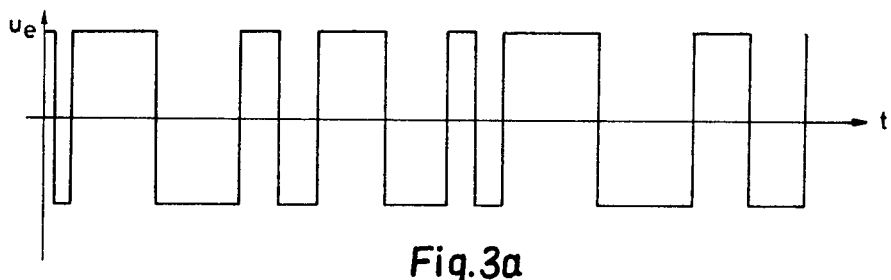
Figure 3B:
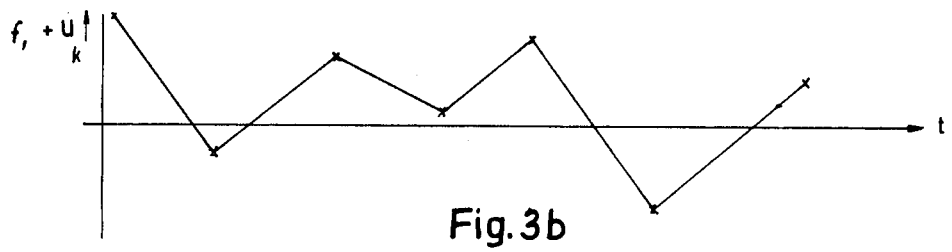

FIGS. 2a and 2b illustrate the relationship between the modulated wave train 4a, here a rectangular oscillation, within a transmitted pulse 3 of the duration D, and the momentary or instantaneous frequency $f$, one below the other. The identifying voltage $u_k$ proportional to the momentary frequency $f$ passes through zero for the center frequency $f_m$ and has positive values for the higher frequency of the modulated wave train 4a. Whereas in FIG. 2a the oscillations of the received voltages $u_e$ have the same time sequence as the modulated wave train 4a within the transmitted pulses 3 due to the presence of a dot-shaped reflecting object, FIGS. 3a and 3b show the relationships for the same transmitted pulses 3 but with reflection from a school of fish 17. The original time sequence of the oscillations 4 of the received voltage $u_e$ is now very much disrupted, and the time sequence of the various momentary frequencies $f$ is greatly disarranged. The course of the identifying voltage $u_k$ (FIG. 3b) now fluctuates correspondingly great, which leads to the described irregular transverse deflection of the electron beam and thus to the areal brightening 32 on the screen 22 of the cathode-ray tube 20 of FIG. 1.

The above explanation of the origin of the areal brightening 32 as compared with the luminous dot 30 on screen 22 of FIG. 2 indicates that for a distinct differentiation between these two indications a transmitted signal 2 should be selected which has a momentary frequency $f$ as constant as possible, but still exhibits a broad spectrum of the oscillations within the transmitted pulse 3. Such a signal can be produced, even better than by the linear frequency modulation illustrated in FIG. 2a, by phase shifting a constant frequency signal $f_1$, which is assumed to be a sinusoidal oscillation in FIG. 4b, in a known manner according to a suitable code. For demonstration purposes the 13-digit Barker code was selected to phase shift the oscillations by 180° as shown in FIG. 4a. FIG. 4c shows the substantially constant course of the momentary frequency $f$, because the differences between two zero passages of the same orientation are constant with the exception of the points in time at which there occurs a phase shift. A reflection of such a transmitted pulse from a single dot-shaped object 16 thus leads to an only slightly distorted luminous dot 30. Since, however, the actually resulting spectrum of a thus modulated wave train 4b of FIG. 4b, as shown in the sketched illustration of FIG. 4d, is very broad when compared to frequency $f_1$ of the individual oscillation, the reflection of such a transmitted pulse from a school of fish 17 leads to a very strong displacement of the frequency arrangement with respect to time and thus to a clear areal brightening 32 on the screen 22 of the cathode-ray tube 20.

The principle circuit diagram shown in FIG. 4e shows an example for producing this resulting wave train 4b. The frequency $f_1$ from the frequency generator 5 is switched by a switch 51 either directly on the keying circuit 7 or via a 180°-phase shift 51a, e.g. represented by an operational amplifier, that as is well known inverts polarity of an output signal as compared with the input signal. The switching of switch 51 is accomplished by a code generator 52.

A further possibility to provide a signal 2 which is suitable for the problem at hand, is to shift the frequency between, e.g., two constant frequencies $f_2$ and $f_3$, according to a code, for example the code shown in FIG. 4a. The resulting wave train 5a within a transmitted pulse of duration D can be derived, for example, from the principal circuit diagram shown in FIG. 5b. Here a switch 51 switches between two generators 5a and 5b for the constant frequencies $f_2$ and $f_3$ and the thus modulated wave train 4c is given directly to the keying circuit 7 (see FIG. 1). The switching of switch 51 is accomplished by a code generator 52 which in a known manner produces, for example, the Barker code of FIG. 4a through a feedback-connected shift register. Such a shifting of the oscillations between different frequencies need of course not be limited to two constant frequencies $f_1$ and $f_2$.

Figure 6:
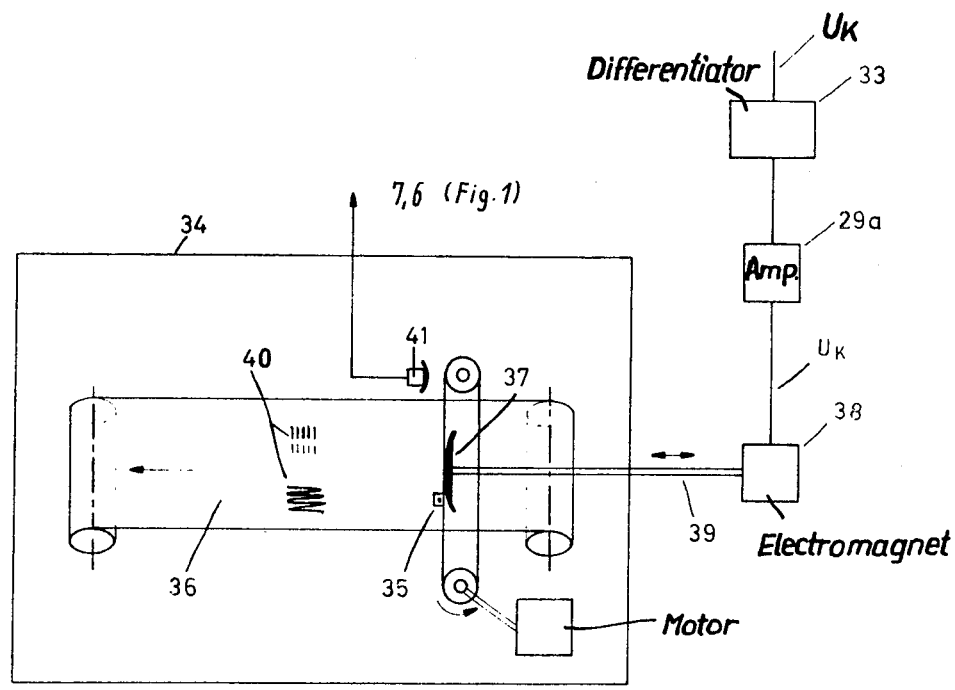
FIG. 6 is a schematic illustration of a writing device whose recording can be modulated by the identifying voltage according to the invention.

Thus far, only the representation of the sounding information on the screen 22 of a cathode-ray tube 20 was discussed. However, the teaching of this invention can also be advantageously applied to ranging systems provided with an echograph 34 (FIG. 6) since with such writing indicator devices the possibility of being able to distinguish between echoes from individual dot-shaped objects 16 and those from, e.g. a school of fish 17 represents a desirable increase in the available information. However, the utilization of the identifying voltage $u_k$ is not as easy in this case as with the cathode-ray tube 20, since the stylus 35 of an echograph 34 which as illustrated is normally guided across the recording paper 36 in a straight line and at constant speed, would have to be provided with an additional electromechanical device for a transverse deflection during its longitudinal movement in order to be able to provide a marking in the event of the arrival of a received voltage $u_e$. This device would become effective in the case of a fluctuating identifying voltage $u_k$. The other possibility to express the additional information about the type of the reflecting object is the degree of darkness of the written lines (indication 40) on the recording paper 36 by influencing the writing voltage of stylus 35 with the identifying voltage $u_k$ which is not very practicable since the degree of darkness of an echogram fluctuates substantially in any case due to the multitudinous informations being offered. In FIG. 6 therefore the example of the solution of the electromechanical transverse displacement of the stylus 35 is selected where the stylus slides past a slide 37. This slide 37 is now mechanically coupled with an electromagnet 38 by means of a lever arrangement 39 which causes the slide 37 to vibrate transverse to the direction of movement of the stylus 35 whenever a fluctuating identifying voltage $u_k$ excites this electromagnet 38 through the power amplifier 29a. In the cases of the individual dot-shaped objects 16 and the school of fish 17 shown in FIG. 1 this device then leads to the indication 40 which, for the purpose of a clearer illustration, is shown in FIG. 6 removed from the momentary path of stylus 35. It is of course understood, that when the echograph 34 is used instead of cathode-ray tube 20 a number of structural components from FIG. 1, i.e. integrator 19 and pulse generator 8, can be eliminated since with the echograph, the continuously driven stylus 35 as indicated controls the modulator 6 and keying circuit 7 of FIG. 1, and hence the transmitted signal 2, by means of a signal generated through a stylus contact 41.

The above-described examples relate to the differentiation between a single reflecting object 16 and a voluminous aggregation of individual objects, i.e., the school of fish 17. In a similar manner, the apparatus according to the present invention also permits a differentiation between linear and areal reflecting objects covered by radar systems which would all be indicated as a line on the screen of ranging systems according to the state of the art.

Figure 7:
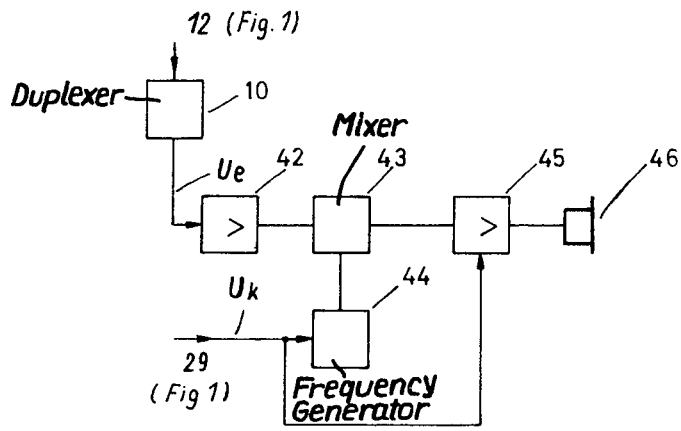
FIG. 7 is a principal block diagram illustrating the modulation of an acoustical representation of the sounding information by means of the identifying voltage according to another embodiment of the invention.

A sole or additional acoustical representation of the sounding information is often employed particularly for deep-sea fishing. Such an acoustical indication represents a substantial aid to the fisherman, since he receives signals relating to changes in the sounding conditions even when he does not happen to be on the bridge or observing the optical instruments. A circuit diagram of such a system according to the invention is shown in FIG. 7, where the received voltages $u_e$ coming from the duplexer 10 are given to a mixer stage 43, if necessary via a preamplifier 42. A signal generator 44 furnishes the frequency signal required to convert the input signal $u_e$ into the audible range. At the output of mixer stage 43 a headset or loudspeaker 46 is connected, if necessary via a final amplifier 45. The identifying voltage $u_k$ in the illustrated example is used both for amplitude modulation, by influencing the amplifiers of the final amplifier 45, and for frequency modulation by detuning the signal generator 44. Obviously, however, either one of the modulation techniques could be used alone. With a constant identifying voltage $u_k$, i.e. with received voltages $u_e$ in the ranging system which originate from a single dot-shaped object 16, the frequency and volume of the acoustically represented sounding information are approximately constant, whereas with a strongly fluctuating identifying voltage $u_k$, i.e. with received voltages $u_e$ originating from a school of fish 17, the frequency and volume fluctuate noticeably in the loudspeaker 46. Thus, it is easily possible to differentiate from the acoustical impression, whether the sounding information originates from a single object 16 of no interest to the fisherman or whether the sounding system 1 has just located a school of fish 17.

Figure 8:
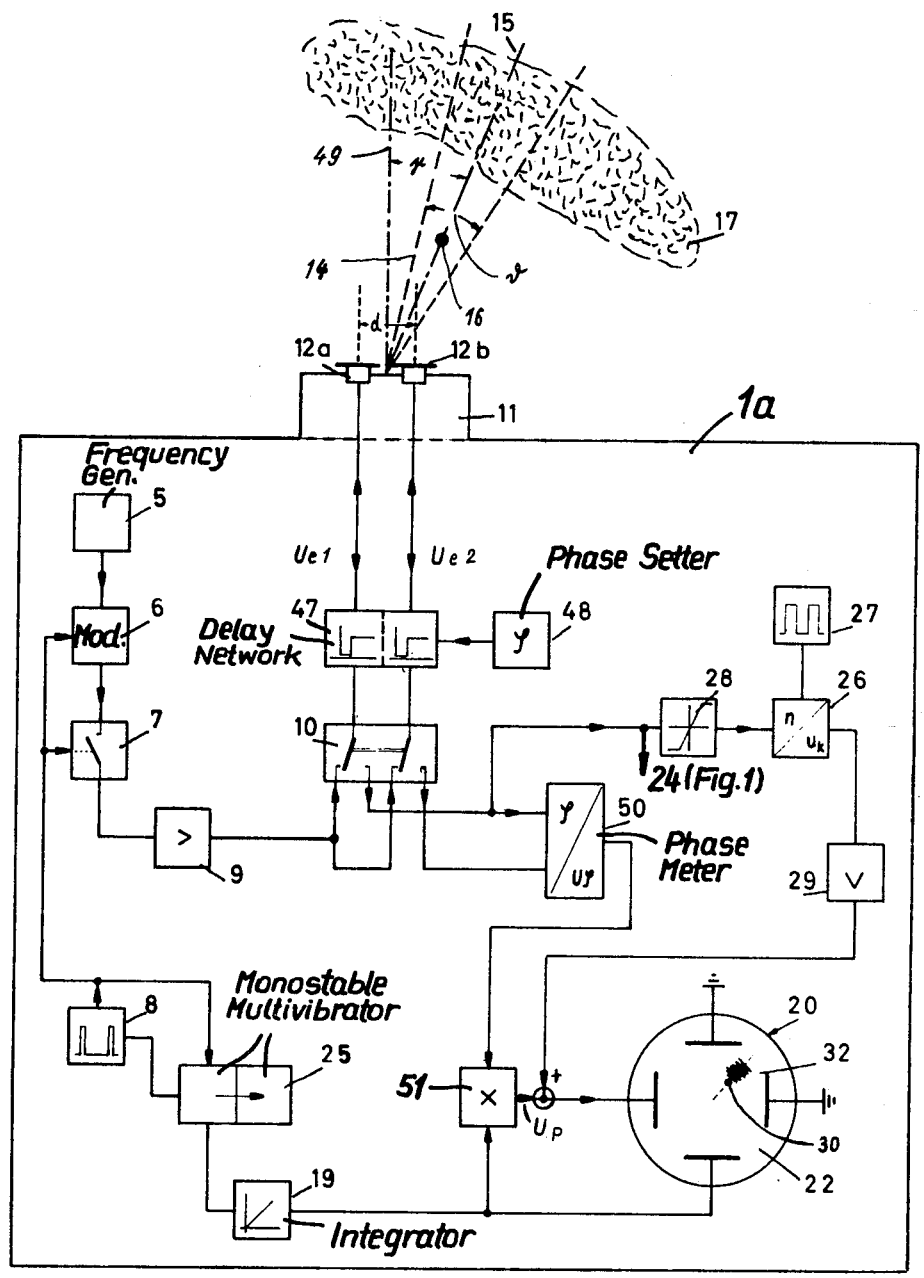
FIG. 8 illustrates the use of the present invention with a sonar system having a base consisting of two resonators or two groups of resonators and producing an indication of the ranging information on the screen of the cathode-ray tube.
Figure 9:
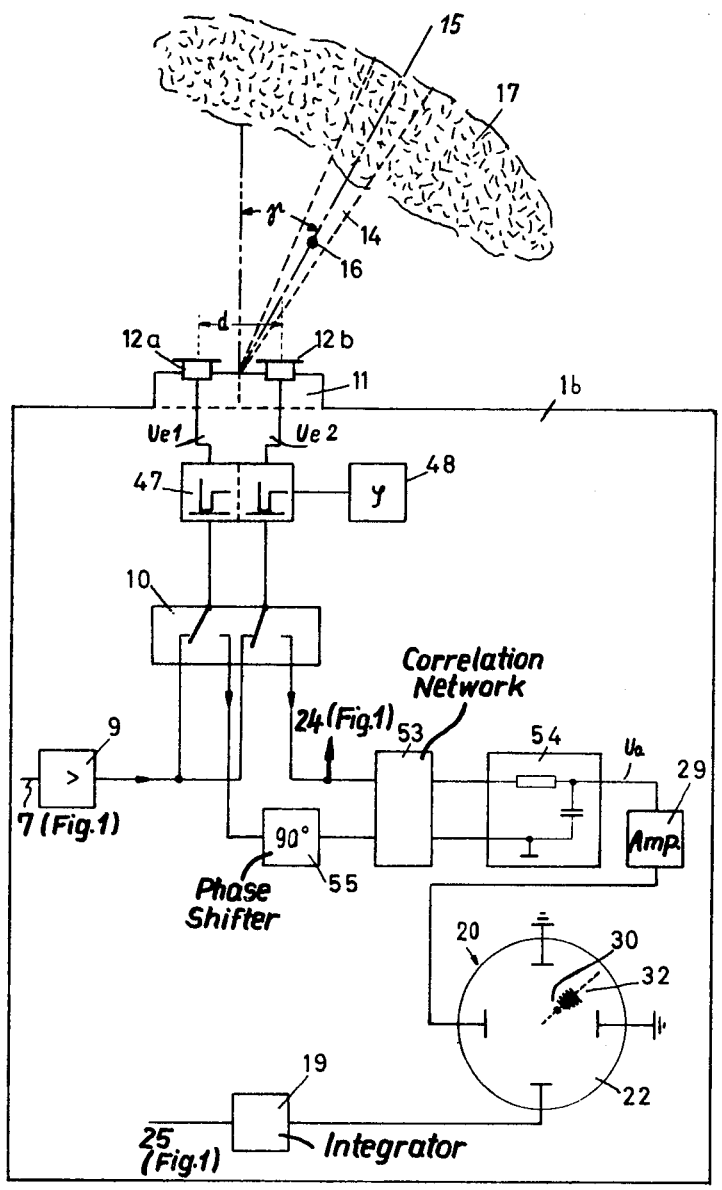
FIG. 9 illustrates a modification of the embodiment of FIG. 8.

The sounding system arrangements 1a and 1b shown in FIGS. 8 and 9 with a subdivision of the base 11 into two groups of resonators 12a, 12b are also known per se. Their advantage when compared with the sounding system 1 shown in FIG. 1 is the possibility of pivoting the transmitting/receiving characteristic 14 by electronic means or to be able to measure the angular deflection of a reflecting object from the main axis 15 of the transmitting/receiving characteristic 14. For this purpose the two groups of resonators 12a and 12b, whose acoustic centers are disposed at distance d from one another, are controlled through a delay network 47 which is itself controllable by means of a phase setter 48 to select the direction $\gamma$ of the main axis 15 with respect to the axis 49 normal to the base 11.

As disclosed in German Pat. No. 966,599, the phase angle between received voltages $u_e$, and $u_{e2}$ is determined by means of a phase detector 50, e.g. a phase meter which is tuned approximately to the center frequency of the oscillations, and a voltage proportional to the phase difference produced. The output signal from the phase meter 50 is multiplied with the momentary value of the voltage for the distance deflection from integrator 19 in a multiplier 51 and this product voltage $u_p$ now serves to deflect the electron beam transversly to the direction of the distance-proportional deflection.

According to the present invention, this product voltage $u_p$ is superimposed with the identifying voltage $u_k$ which was amplified in amplifier 29 if required, so that in the case of a fluctuating identifying voltage $u_k$ due to sounding information originating from a school of fish 17, a quick transverse deflection will again produce an areal brightening 32 on the screen 22 of the cathode-ray tube 20.

The transfer of the direction $\gamma$ of the main axis 15 corresponding to the setting of phase setter 48, to the direction of deflection of the electron beam in the cathode-ray tube 20 need not be discussed at this point since a plurality of circuits are known for this purpose, e.g., from the radar art. German Pat. No. 1,162,727 also relates to this problem.

In the embodiments according to FIGS. 1 and 8 the determination of the momentary frequency $f$ was accomplished by means of a combination of a Schmitt trigger 28 with a digital-analog converter 26. It is also understood however that other commercially available frequency meters operating according to different principles can also be used for this purpose within the scope of the present invention, so long as they furnish a voltage as their measuring value.

Whereas the basic circuit arranged according to the present invention within the sounding system 1a of FIG. 8 still coincides with that of FIG. 1, the embodiment shown in FIG. 9 shows a different realization of the circuit arrangement according to the present invention.

The sounding system 1b in FIG. 9 substantially consists of a phase coincidence correlator 53 with a subsequently connected integration member 54 which integrates during the observation period $\Delta T$. The phase coincidence correlator 53 acts as a phase discriminator between the two received voltages $u_{e1}$ and $u_{e2}$ and has one of its inputs directly connected to the two groups of resonators 12a and 12b of base 11 and the other of its inputs connected to the resonator via a broadband-action 90° phase shifter 55. The operation of this phase coincidence correlator 53 which is part of the state of the art in the communications art application of the correlation technique, is identical with that of a logic multiplier according to the laws of Boole's logical algebra. The input values are the momentary polarities of the two received voltages $u_{e1}$ and $u_{e2}$. The average value of the output voltage $u_a$ of this arrangement is proportional to the direction $\gamma$ of the acoustical center of mass of the covered sector of the school of fish 17 or to the angular deflection (direction $\gamma$) of an individual covered object 16, but the momentary value of the amplitude of this output voltage $u_a$ vaccilates back and forth, due to the dimensioning of the integration member 54, with the presence of sounding information originating from a school of fish 17 due to the time delay between the arrival of the echoes at the two groups of resonators 12a and 12b and consequently producing the blurred areal brightening 32 as the indication on the screen 22 of the cathode-ray tube 20.

By pivoting base 11 or by electronically pivoting the transmitting/receiving characteristic 14 with the aid of the phase setter 48 or — in other embodiments of radar systems — by varying the center frequency $f_m$ of the oscillations 4 and by observing the represented sounding information on the screen 22, the fisherman can then easily determine the expansion of the school of fish 17 without being misled by individual reflecting objects 16 which are also reported, since the latter are distinguished by the limited-size luminous dots 30.

According to the present invention it is therefore possible for the user to supplement the known fish locating devices with an additional device according to the present invention in a manner which is technically simpler and sensible to operate with respect to the representation of the sounding information so that the fisherman can clearly see from the projected indication whether the sounded object is a single reflector or a congregation of individual objects, i.e., an entire school of fish. Preliminary practical tests with such a device in conjunction with a mechanically pivotal base have indicated, for example, during forward sounding, the congregation of a school of fish, and after passage thereover with the dragged net the rearward sounding indicated their separation into two halves which appeared on the screen of a cathode-ray tube as two areal indications and the compact, since partially filled, net as a bright spot of light.

It will be understood that the above description of the present invention is susceptible of various modifications, changes and adaptations, and the same are intended to be comprehended within the meaning and range of equivalents of the appended claims.

I claim:

1. In a sonar system, particularly for use for deep-sea fishing, including a transmitting means for the directed emission of keyed pulses each of which comprises a plurality of non-monochromatic oscillations, and a receiving means provided with means for converting the received signals into an indication of the ranging information, the improvement wherein:
   a. said transmitting means includes means for providing keyed pulses of a relatively long duration with each of said pulses having a distinct predetermined time arrangement of its oscillations, and being broadbanded when compared with its characteristic center frequency; and
   b. said receiving means includes means responsive to the received signals for producing an identifying voltage proportional to the instantaneous frequency of the received signal and means for applying said identifying voltage to said converting means to modulate said indication, whereby the resulting indication represents whether the received signal originated from an individual object or from a bunched group of objects.

2. A sonar system as defined in claim 1 wherein said keyed pulse providing means includes means for linearly frequency-modulating said center frequency in order to provide the distinct time arrangement of the oscillation in each pulse.

3. A sonar system as defined in claim 1 wherein said keyed pulse providing means includes means for shifting the phase of said center frequency according to a predetermined code in order to provide said distinct time arrangement of the oscillations in each pulse.

4. A sonar system as defined in claim 1 wherein said keyed pulse providing means includes means for alternating said oscillations between at least two different frequencies according to a predetermined code in order to provide said distinct time arrangement of the oscillations in each pulse.

5. A sonar system as defined in claim 1 wherein said means for producing the identifying voltage proportional to the instantaneous frequency is responsive to the number of zero crossings of the voltages corresponding to the signals during a predetermined time period which is short when compared with the duration of the transmitted pulses in order to produce said identifying voltage.

6. A sonar system as defined in claim 5 wherein said predetermined time period is of the order of magnitude of the period of said center frequency of the oscillations.

7. A sonar system as defined in claim 6 wherein said means for producing said identifying voltage comprises a Schmitt trigger having the received signals applied to the input thereof and a digital-analog converter responsive to the output pulses therefrom.

8. A sonar system as defined in claim 1 wherein said converting means includes a cathode-ray tube the beam of which is brightness controlled by the received signals and is deflected in a first direction in accordance with the ranging information, and wherein said identifying voltage is applied to said tube to deflect said beam in a direction transverse to said first direction.

9. A sonar system as defined in claim 1 wherein said converting means includes a recorder for the optical representation of the ranging information, and wherein means responsive to said identifying voltage are provided for deflecting the writing member of said recorder in a direction transverse to its distance-proportional movement.

10. A sonar system as defined in claim 1 wherein said converting means includes means producing an audible representation of the ranging information, and wherein said receiving means includes means for modulating the received signal with said produced identifying voltage.

11. A sonar system as defined in claim 10 wherein said modulating means frequency modulates said received signals with said identifying voltage.

12. A sonar system as defined in claim 11 wherein said modulating means additionally amplitude modulates said received signals with said identifying voltage.

13. A sonar system as defined in claim 1 wherein the pulses are transmitted and received by means of a pair of spaced transducer means and wherein said receiving means includes: a phase measuring means periodically connected to both of said transducer means and tuned to approximately said center frequency of the transmitted oscillations for determining the direction of the received echoes by forming a phase proportional voltage; a cathode-ray tube whose beam is brightness-controlled by the received signals when an echo arrives, means for producing and applying a distance-proportional signal to the deflection system of said cathode-ray tube to deflect said beam in a first direction, said distance deflection voltage producing means being periodically triggered in synchronism with the emission of the transmitted pulses; means responsive to said phase proportional voltage and to said distance proportional voltage for producing and applying a directional voltage signal to the deflection system of said cathode-ray tube for deflecting said beam in a direction transverse to said first direction; and, means for modulating said directional voltage signal with said identifying signal.

14. A sonar system as defined in claim 8 wherein the pulses are transmitted and received by means of a pair of spaced transducer means, and wherein said means for producing said identifying voltage comprises: a phase coincidence correlator means acting as a phase discriminator whose output is connected to an integrating means for integrating the input signals thereto over a period of time which is short when compared with the duration of the transmitted pulses, said phase coincidence correlator means having one of its inputs directly connected to one of said pair of transducer means and the other of the inputs connected to the other of said pair of transducer means via a broadband 90° phase shifter.

* * * * *